United States Patent [19]

Bodnar et al.

[11] 4,239,653

[45] Dec. 16, 1980

[54] PROCESS FOR THE PREPARATION OF NON-PYROPHORIC PALLADIUM CATALYSTS

[75] Inventors: János Bodnár, Budapest; György Lugosi, Felsögöd, György L. Nagy, all of Hungary

[73] Assignee: Chinoin Gyogyszer, Budapest, Hungary

[21] Appl. No.: 963,882

[22] Filed: Nov. 27, 1978

[51] Int. Cl.³ .......................... B01J 21/18; B01J 23/44
[52] U.S. Cl. ................................... 252/447; 568/903; 585/277; 564/423; 564/490
[58] Field of Search ......................................... 252/447

[56] References Cited

U.S. PATENT DOCUMENTS

| | | | |
|---|---|---|---|
| 2,930,765 | 3/1960 | Cooper et al. | 252/447 |
| 3,736,265 | 5/1973 | Suggit | 252/447 |

FOREIGN PATENT DOCUMENTS 1510195  5/1978  United Kingdom ..................... 252/447

*Primary Examiner*—P. E. Konopka
*Attorney, Agent, or Firm*—Hubbell, Cohen, Stiefel & Gross

[57] ABSTRACT

The present invention relates to a process for the preparation of non-pyrophoric catalyst having controlled particle size and activity comprising suspending active charcoal of homogeneous pore distribution in a diluted solution of a palladium salt or salt complex, if desired in the presence of an aliphatic alcohol, stirring the solution, filtering the catalyst coal, followed by treatment of the sorbed palladium salt or salt complex with alkali if desired and stirring it as long as required for the accumulation of the sorbed palladium compounds, reducing same by methods known, repeating the above mentioned steps, if desired any number of times and drying the obtained catalyst after washing.

18 Claims, No Drawings

PROCESS FOR THE PREPARATION OF NON-PYROPHORIC PALLADIUM CATALYSTS

The present invention relates to the preparation of non-pyrophoric palladium catalysts. The metal palladium, derivatives and salts thereof are widely used as catalysts in hydrogenation and dehydrogenation reactions. Because of the unfavorable technological properties of the metal palladium, in practice the catalysts are used on a carrier. As a carrier active charcoal is generally used due to its favorable technological properties and because it is readily recovered and inexpensive. When preparing the catalysts on charcoal carrier in palladium salts are dissolved in water or an acid, a suspension is prepared with the active charcoal and to this suspension an alkali, preferably caustic lye of soda is added until neutral pH and the palladium hydroxide granules precipitated on the active charcoal are reduced to metal palladium by reaction with hydrogen gas. The thus prepared catalyst is dried and it reacts with the oxygen of the air and it bursts into flame. The danger of accidents and the technological disadvantage of this method may be eliminated only by poisining the catalyst, decreasing thus the activity of the catalyst.

It is further known, that micellas may be formed in the solution of palladium salts by using surfactants, and these micellas may be evaporated in vacuo onto the carrier, decomposed with caustic lye of soda followed by the formation of palladium granules of homogeneous size distribution corresponding to the size of the micellas. Thus by the method of Turkevich et al. a catalyst could be prepared which is sufficiently highly active but is not pyrophoric. Science 169 (1970) 873.

It is further known that the palladium ions located on the ion exchanger sorbents may move after reduction for example upon heat effect in the surface field and due to the van der Waals forces the ions may be accumulated. Similar phenomenon could be observed in the movement of the palladium hydroxide molecules, though in this case the accumulation was explained by the formation of chemical bonds of type Pd-O-Pd accompanied by elimination of water.

The present invention is directed to the preparation of non-pyrophoric palladium catalysts of controlled particle size and activity, comprising suspending active charcoal of homogeneous pore distribution in a diluted solution of a palladium salt or salt complex, if desired in the presence of an aliphatic alcohol, stirring the solution, followed by the filtration of the catalyst charcoal, if desired, treating the sorbed palladium salt or salt complex with an alkali, stirring it as long as it is necessary to the accumulation of the sorbed palladium derivatives, reducing it by methods known, repeating the above steps as often as necessary and drying the thus obtained catalyst after optional washing.

We have found that from palladium salts or salt complexes which are adsorbed on active charcoal of homogeneous pore distribution a non-pyrophoric and appropriately highly active catalyst of homogeneous particle size may be obtained upon treatment with an alkali. As active charcoal of homogeneous pore distribution preferably steam activated coal containing predominantly pores of a diameter of less than 15 Å is used.

We have further found that the adsorption processes and thus the accumulation caused by the later alkaline treatment may be favourably influenced by using additives which block part of the surface, i.e. the additives are a rival to the adsorption process. As additives aliphatic alkanols, preferably alcohols containing 1 to 6 carbon atoms may be employed.

We have further found that the surface density of the palladium salts on the active charcoal may be increased by using alcohols while maintaining the salt concentration at an unchanged low value. According to the process of the invention in addition to the completely irreversible adsorption such a density of the palladium ions can be achieved, which due to the steric proximity promotes the accumulation which is necessary to ensure a suitably high activity.

We have further found that the accumulation of the palladium ions and the hydroxy derivatives thereof in the surface field may be well controlled by the amount of the alkali used for decomposition and by chosing the duration of the granule formation and thus a catalyst having different particle size and activity may be prepared having the same metal content.

According to the embodiment of the present invention a diluted solution of bivalent or tetravalent palladium salts, or a mixture thereof may be prepared by using an additive, preferably lower aliphatic alcohol, in an amount that the active charcoal of homogeneous distribution of pores sorbes 50 to 100% of the total amount of the palladium salts. As a diluted solution the palladium salt or salt complex is used at a maximum concentration of 0.1, preferably less than 0.05 mole. A solution of a palladium salt or salt complex in water or an organic solvent, inorganic or organic acid or a mixture thereof may be used. The organic solvents which may be used in this invention include ketones and, preferably, acetone. The inorganic acids used in this invention include halogen acids, oxyhalogen acids, sulphuric acid and, preferably, hydrochloric acid and perchloric acid. Acetic acid and formic acid are the preferred organic acids. A mixture of palladium salt or salt complex, water, inorganic acid and a lower alcohol is preferably employed. After adding the active charcoal the suspension is preferably stirred at least for 1 hour to ensure the complete pore diffusion. After the adsorption has set in the catalyst charcoal is filtered off and the structure of the adsorption layer is decomposed according to the desired activity range (or is left unchanged). The decomposition is preferably carried out at 0° to 40° C., preferably at room temperature for 0.5 to 5 hours with alkali, preferably sodium, potassium or ammonium hydroxide in a 3 to 6 fold excess related to palladium, by adding the catalyst into the alkali, preventing thus the decontrolled rearrangement of the adsorbed layer upon the continuously changing acidic solution. If the complete activity capacity is to be achieved, the palladium salts in the adsorption layer are entirely converted to metal hydroxide by adding an equivalent amount of alkali. After the decomposition with alkali 1 to 5 hours are required to accomplish the accumulation process under steady stirring at room temperature. The catalyst is then filtered, washed with ion exchanged water and hydrogenated for 0.5 to 3 hours in ion exchanged water, preferably at a pressure of 5 to 10 atm. After the hydrogenation the accumulated metal granules are converted to palladium metal.

The hydrogenated catalyst is again rinsed back into the adsorption system, in case that the additive used in the course of the previous sorbing in order to increase the density of the surface, prevented the sorption of the total amount of salt. In the course of the new step the entire amount of the salt is generally adsorbed irreversibly on the formed active centers (palladium granules). The accumulation and reduction processes described above are repeated and thus a catalyst containing palladium in an amount of 0.1 to 10% by weight, preferably 5% by weight, having sufficiently homogeneous particle size and changing activity depending on the particle size may be obtained. According to the process of the invention a palladium catalyst of an average particle diameter of 40-800 Å, preferably 60-400 Å is obtained. It has to be noted that the process may optionally be carried out in several steps if required.

The advantage of the process of the invention is based upon the fact that the desired catalyst is prepared by well reproduceable technological steps and the process is not expensive.

A further advantage of the process is its suitability to prepare catalysts of different activity and particle size having the same metal content. The prepared catalysts may be stored and treated in dry state due to the homogeneous particle size and thus the accidents in industrial scale labour may be reduced to a minimum.

Further details of the invention are illustrated by the following Examples without limiting the scope of the invention.

EXAMPLE 1

20 g. of Norit Carbo C extra active charcoal of a large surface having homogeneous pore distribution, preferably activated by steam, 10.58 g. of palladium chloride solution containing 9.5% of palladium in perchloric acid, 200 ml. of ion exchanged water and 10 ml. of butanol are stirred for 1 hour. The overwhelming part of the palladium chloride is sorbed by the active charcoal. The mixture is filtered off and the coal on the filter containing wet palladium chloride is stirred for 1 hour with 350 ml. of 0.1 N sodium hydroxide, filtered off and the coal is washed by suspending five times with 200 ml. of ion exchanged water. The coal containing palladium hydroxide is then suspended in 200 ml. of ion exchanged water, hydrogenated for 40 minutes at a pressure of 5 to 3 atm. and filtered off. The thus obtained wet palladium coal is again admixed with the mother liquor obtained after the first sorption which still contains palladium chloride. The mixture is stirred for 1 hour and filtered off. The filtrate does not contain palladium chloride anymore. The filtered catalyst coal is stirred with 150 ml. of 0.1 N sodium hydroxide solution, filtered, washed by suspending four times with 200 ml. ion exchanged water at a pressure of 5 to 3 atm. for 40 minutes. It is filtered off, washed twice with 200 ml. of ion exchanged water and dried in vacuo and later at room temperature to a steady weight.

20.7 g. of catalyst is obtained.

| Composition: | |
|---|---|
| Pd content | ~5% |
| Active charcoal content | ~90% |
| Water content | ~4-5% |
| Ash content | ~40% |
| pH of aqueous solution after shaking | ~5 |
| Pore volume | 1,5 ml/g |
| BET surface | 1270 m$^2$/g |
| Average particle diameter | ~150-200 Å. |

Its activity may be characterized by the data given in the table.

EXAMPLE 2

10 g. of Norit SX plus active charcoal preferably activated by steam and having large surface, 5.2 g. of a solution containing 9.5% of palladium chloride as described in Example 1 and 100 ml. of ion exchanged water are measured and admixed and the mixture is stirred for 1 hour. The palladium chloride is absorbed by the active charcoal within this one hour. The suspension is filled into a hydrogenation equipment and hydrogenated for 40 minutes at a pressure of 5 to 3 atm. The catalyst coal is then filtered, washed by suspending four times with 100 ml. of ion exchanged water and dried in vacuo and then at room temperature.

The particle diameter of the obtained catalyst is 60 to 75 Å. Its activity may be characterized by the data given in the following table.

| | Hydrogenation rate | |
|---|---|---|
| Bond | catalyst according to Example 1 | catalyst according to Example 2 |
| nitrobenzene ($NO_2$) | 8,75 ml/min | 0,95 ml/min |
| acetonitrile (—C≡N) | 0,72 ml/min | 0,13 ml/min |
| 1,4-butindiol (—C≡C—) | 9,10 ml/min | 13,20 ml/min |
| cyclohexene (—CH=CH—) | 7,80 ml/min | 0,17 ml/min |

What we claim is:

1. A process for the preparation of a non-phyrophoric palladium catalyst having controlled particle size and activity, comprising:
   (a) suspending active charcoal of homogeneous pore distribution in a diluted solution of palladium salt or palladium salt complex in the presence of an alcohol to effect sorption of said palladium salts or palladium salt complex by said active charcoal, thereby forming a catalyst charcoal;
   (b) filtering said catalyst charcoal from said solution of palladium salt or palladium salt complex followed by;
   (c) treating the sorbed palladium or palladium salt complex with an alkali, thereby forming a hydroxide of palladium and thereafter;
   (d) reducing the hydroxide of palladium to palladium, thereby forming a palladium catalyst.

2. A process as recited in claim 1, wherein said alcohol is a lower aliphatic alcohol containing 1-6 carbon atoms.

3. A process as recited in claim 1, wherein said diluted solution of palladium salt or palladium salt complex comprises a solution of palladium salt or palladium salt complex in a solvent selected from the group consisting of water, an organic solvent, an inorganic acid, an organic acid and mixtures thereof.

4. A process as recited in claim 1, wherein said organic solvent is a ketone.

5. A process as recited in claim 4, wherein said ketone is acetone.

6. A process as recited in claim 3, wherein said inorganic acid is a halogen acid, an oxyhalogen acid or sulfuric acid.

7. A process as recited in claim 6, wherein said halogen acid is hydrochloric acid.

8. A process as recited in claim 6, wherein said oxyhalogen acid is perchloric acid.

9. A process as recited in claim 3, wherein said organic acid is formic acid or acetic acid.

10. A process as recited in claim 1, wherein said diluted solution of palladium salt or palladium salt complex comprises a solution of palladium salt or palladium salt complex in a solvent comprising a mixture of water, an inorganic acid and a lower aliphatic alcohol.

11. A process as recited in any of the claims 1 to 9, wherein the concentration of the palladium salt or palladium salt complex solution is between 0.05 molar and 0.1 molar.

12. A process as recited in any of the claims 1 to 9, wherein reduction is carried out by hydrogenation.

13. A process as recited in claim 1, wherein absorption is carried out at a temperature from 0°–40° C.

14. A process according to claim 1, wherein said sorption is carried out at room temperature for 0.5 to 5 hours.

15. A process as recited in any of the claims 1 9, 13 and 14, wherein said alkali is selected from a group consisting of sodium hydroxide, potassium hydroxide and amonium hydroxide.

16. A process as recited in claim 1, wherein the alkali treatment is carried out by adding said catalyst charcoal into said alkali.

17. A process as recited in any of the claims 1, 13 and 14, wherein the amount of alkali which is used is three to six times the amount of said palladium salt or said palladium salt complex.

18. A process as recited in claim 1, which comprises stirring the solution after said treatment with said alkali for one to five hours.

* * * * *